United States Patent
Shao et al.

(10) Patent No.: US 10,967,527 B2
(45) Date of Patent: Apr. 6, 2021

(54) BRAKE RELEASE DEVICE AND ROBOT MANIPULATOR EMPLOYING SAME

(71) Applicant: DELTA ELECTRONICS, INC., Taoyuan (TW)

(72) Inventors: Chi-Huan Shao, Taoyuan (TW); Chih-Ming Hsu, Taoyuan (TW); Hung-Sheng Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 185 days.

(21) Appl. No.: 16/291,304

(22) Filed: Mar. 4, 2019

(65) Prior Publication Data

US 2020/0180169 A1     Jun. 11, 2020

(30) Foreign Application Priority Data

Dec. 6, 2018 (CN) .......................... 201811487675.8

(51) Int. Cl.
*F16D 65/14* (2006.01)
*B25J 19/00* (2006.01)
(Continued)

(52) U.S. Cl.
CPC ......... *B25J 19/0004* (2013.01); *B25J 19/066* (2013.01); *F16D 59/02* (2013.01);
(Continued)

(58) Field of Classification Search
CPC ................ F16D 59/02; F16D 2121/16; F16D 2121/005; F16D 2127/02; F16D 2127/04;
(Continued)

(56) References Cited

U.S. PATENT DOCUMENTS 2,620,901 A * 12/1952 Stearns ................... F16D 66/02
                                                        188/171
5,133,201 A *  7/1992 LaMott ................... B60R 25/09
                                                        188/265
(Continued)

FOREIGN PATENT DOCUMENTS

CN         105626722 A     6/2016
CN         207327036 U     5/2018
(Continued)

OTHER PUBLICATIONS

Machine translation of JP 63-047889 (no date).*

*Primary Examiner* — Nicholas J Lane
(74) *Attorney, Agent, or Firm* — Kirton McConkie; Evan R. Witt

(57) ABSTRACT

A brake release device and a robot manipulator employing the same are provided. The robot manipulator includes a housing and a brake element. The housing defines an inner space and has an opening, and the inner space is in communication with a space outside the housing through the opening. The brake element is disposed within the inner space. The robot manipulator stops or is allowed to actuate according to a position of the brake element. The brake release device is connected with the brake element. The brake release device is partially located in the inner space, and the brake release device partially penetrates through the opening and is exposed from the housing. When the part of the brake release device exposed from the housing is moved by an external force so as to drive the brake element to move synchronously, the robot manipulator is allowed to actuate.

19 Claims, 11 Drawing Sheets

(51) Int. Cl.
*B25J 19/06* (2006.01)
*F16D 59/02* (2006.01)
*F16D 129/04* (2012.01)
*F16D 123/00* (2012.01)
*F16D 125/58* (2012.01)
*F16D 127/04* (2012.01)

(52) U.S. Cl.
CPC ...... *F16D 2123/00* (2013.01); *F16D 2125/58* (2013.01); *F16D 2127/04* (2013.01); *F16D 2129/04* (2013.01)

(58) Field of Classification Search
CPC .. F16D 2127/06; F16D 63/006; B25J 19/0004
See application file for complete search history.

(56) References Cited

U.S. PATENT DOCUMENTS

| | | | |
|---|---|---|---|
| 2018/0200896 A1* | 7/2018 | Boyland | F16D 66/00 |
| 2020/0039094 A1* | 2/2020 | Ayuzawa | F16D 63/006 |
| 2020/0324406 A1* | 10/2020 | Ayuzawa | H02K 7/116 |

FOREIGN PATENT DOCUMENTS

| | | | | |
|---|---|---|---|---|
| GB | 2164317 A | * | 3/1986 | F16D 55/28 |
| JP | 63047889 U | * | 3/1988 | |

\* cited by examiner

BRAKE RELEASE DEVICE AND ROBOT MANIPULATOR EMPLOYING SAME

CROSS-REFERENCE TO RELATED APPLICATION

This application claims priority to China Patent Application No. 201811487675.8, filed on Dec. 6, 2018, the entire content of which is incorporated herein by reference for all purposes.

FIELD OF THE DISCLOSURE

The present disclosure relates to a brake release device, and more particularly to a brake release device and a robot manipulator employing the same.

BACKGROUND OF THE DISCLOSURE

Nowadays, with the development in automation, robot manipulators have been extensively used. The brake device is a necessary part of the robot manipulator. Only when the brake thereof is released, the robot manipulator is allowed to move. In order to ensure the smooth operation of the robot manipulator and the safety of operators, the robot manipulator has to brake or release the brake immediately and stably. Conventionally, the brake is usually released through excitation. However, an external power source is required for the excitation. If the power is interrupted and cannot be recovered at once, it is unable to release the brake. Under this circumstance, the brake can only be released manually through removing the housing of the robot manipulator, which takes a lot of time and may causes doubts about safety.

Therefore, there is a need of providing a brake release device and a robot manipulator employing the same in order to overcome the above drawbacks.

SUMMARY OF THE DISCLOSURE

An object of the present disclosure provides a brake release device and a robot manipulator employing the same. In the robot manipulator, the brake element is located in the inner space of the housing. According to the location of the brake element, the robot manipulator brakes or releases the brake. The brake release device is connected with the brake element, and a part of the brake release device penetrates through the opening on the housing and is exposed from the housing. The operator can apply an external force on the part of the brake release device exposed from the housing, and the brake release device drives the brake element to move synchronously. Consequently, the robot manipulator releases the brake. Since the operator can release the brake of the robot manipulator by pushing or pulling the brake release device outside the robot manipulator, the robot manipulator is able to release the brake immediately without removing the housing when the power is interrupted exceptionally.

In accordance with an aspect of the present disclosure, there is provided a brake release device for a robot manipulator. The robot manipulator comprises a housing and a brake element. The housing defines and forms an inner space, the housing has an opening, and the inner space is in communication with a space outside the housing through the opening. The brake element is disposed within the inner space. The robot manipulator stops or is allowed to actuate according to a position of the brake element. The brake release device is connected with the brake element, a part of the brake release device is located in the inner space, and the other part of the brake release device penetrates through the opening and is exposed from the housing. When the part of the brake release device exposed from the housing is moved by an external force so as to drive the brake element to move synchronously, the robot manipulator is allowed to actuate.

In accordance with another aspect of the present disclosure, there is provided a robot manipulator comprising a housing, a brake element and a brake release device. The housing defines and forms an inner space, the housing has an opening, and the inner space is in communication with a space outside the housing through the opening. The brake element is disposed within the inner space. The robot manipulator stops or is allowed to actuate according to a position of the brake element. The brake release device is connected with the brake element, a part of the brake release device is located in the inner space, and the other part of the brake release device penetrates through the opening and is exposed from the housing. When the part of the brake release device exposed from the housing is moved by an external force so as to drive the brake element to move synchronously, the robot manipulator is allowed to actuate.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
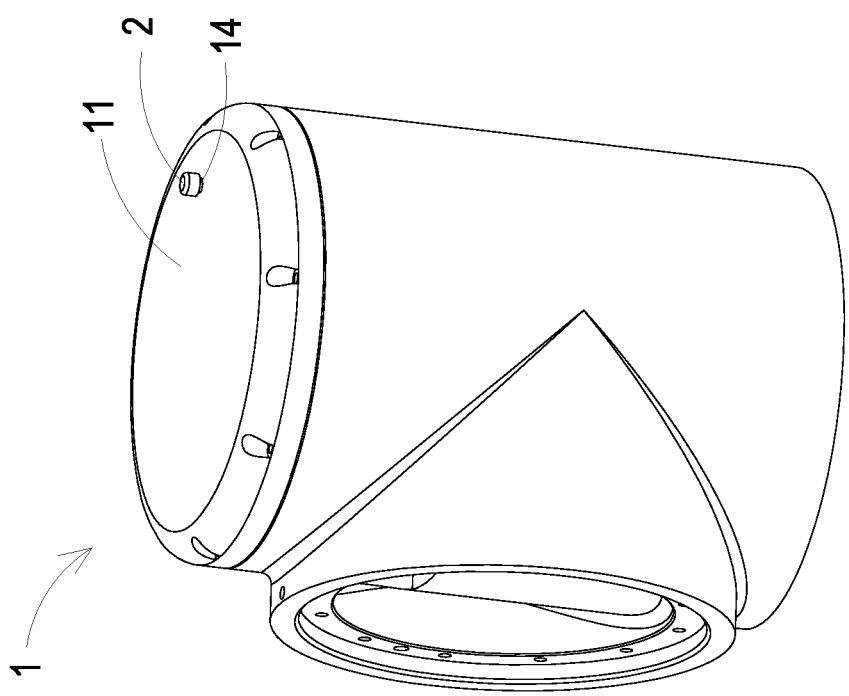
FIG. 1 is a schematic perspective view illustrating a robot manipulator and a brake release device according to an embodiment of the present disclosure.
Figure 2:
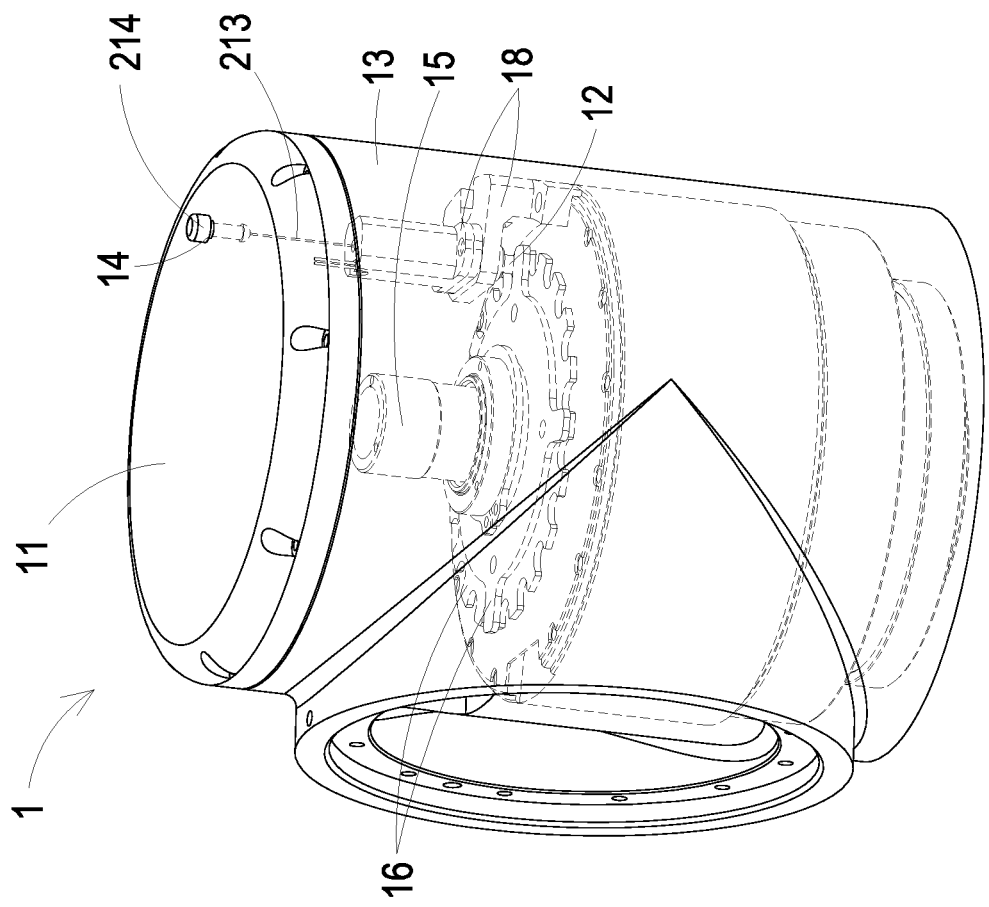
FIG. 2 is a schematic view showing the inner structure of the robot manipulator of FIG. 2.
Figure 3A:
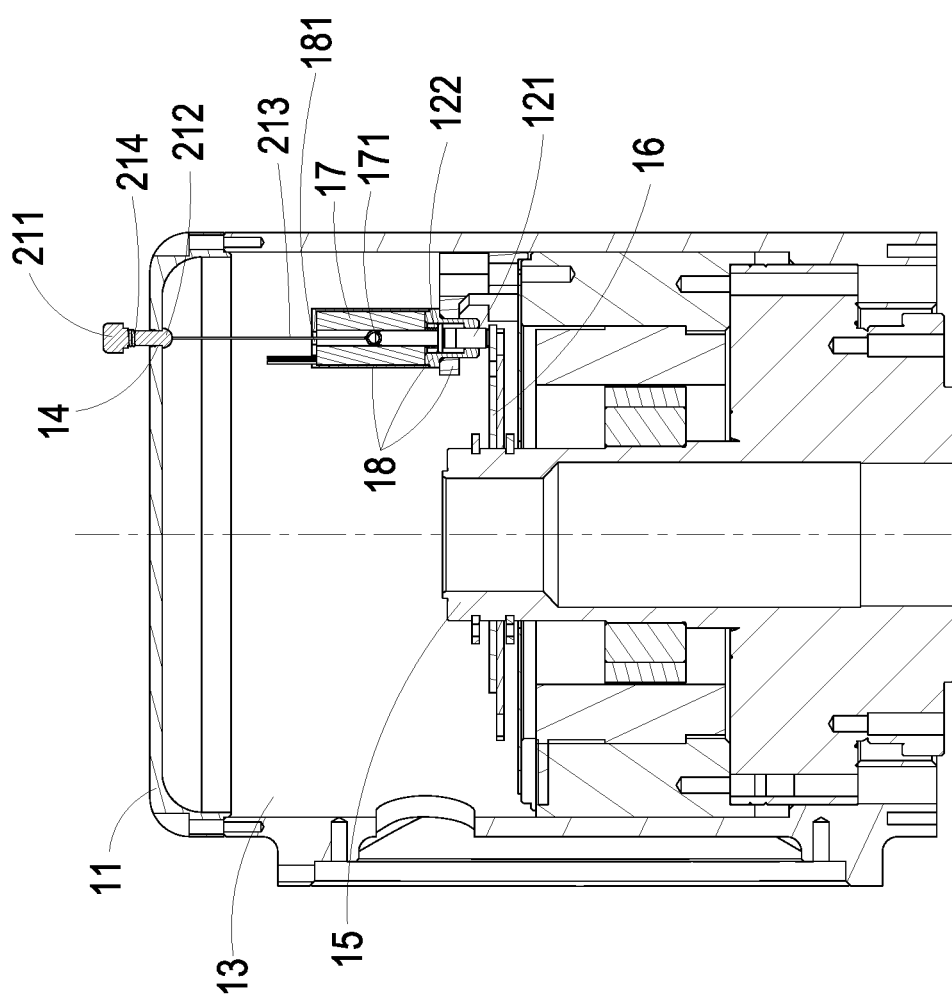
FIG. 3A is a cross-section view of the robot manipulator and the brake release device of FIG. 1, wherein the robot manipulator brakes.
Figure 3B:
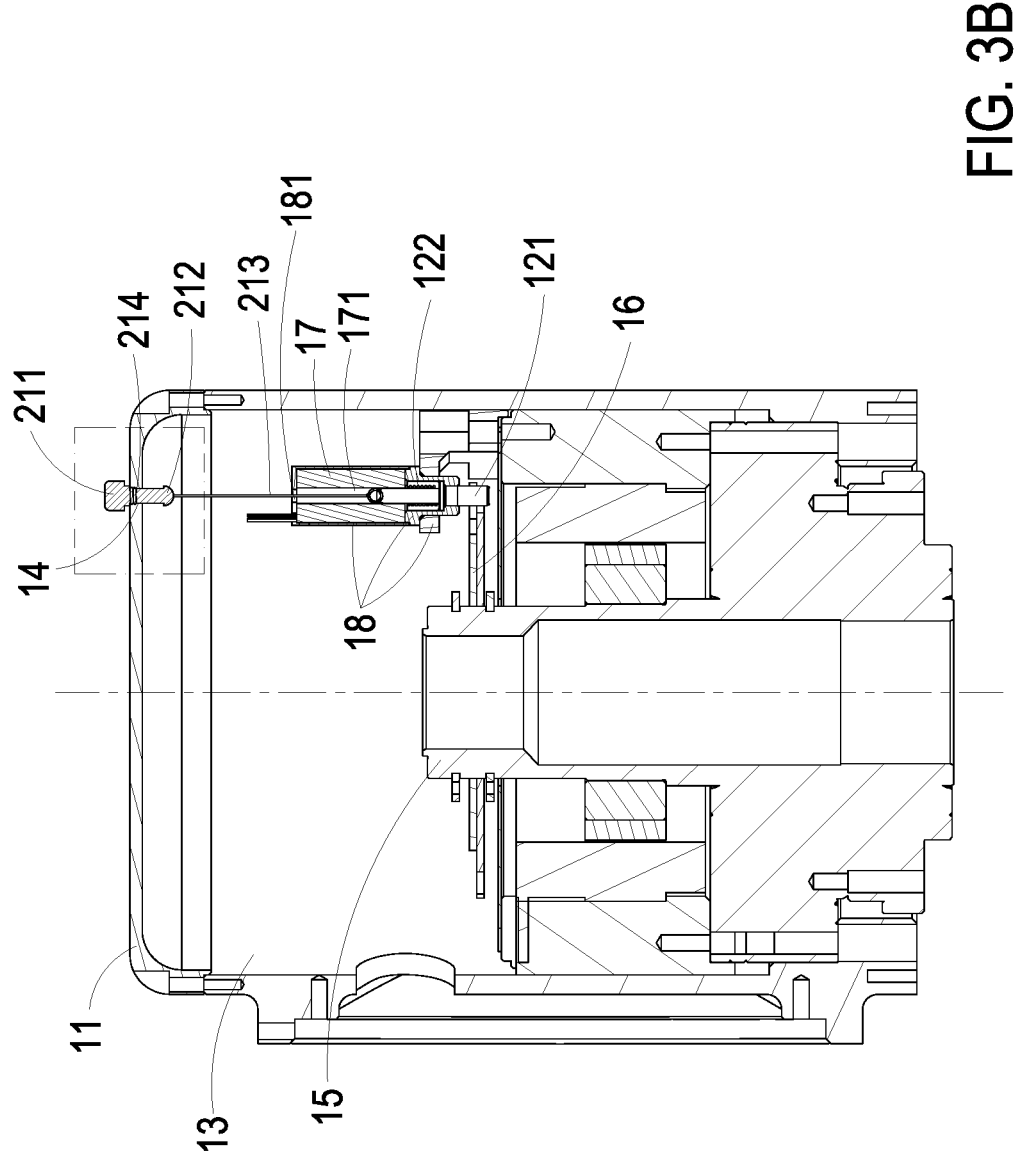
FIG. 3B is a cross-section view of the robot manipulator and the brake release device of FIG. 1, wherein the robot manipulator releases the brake.
Figure 4:
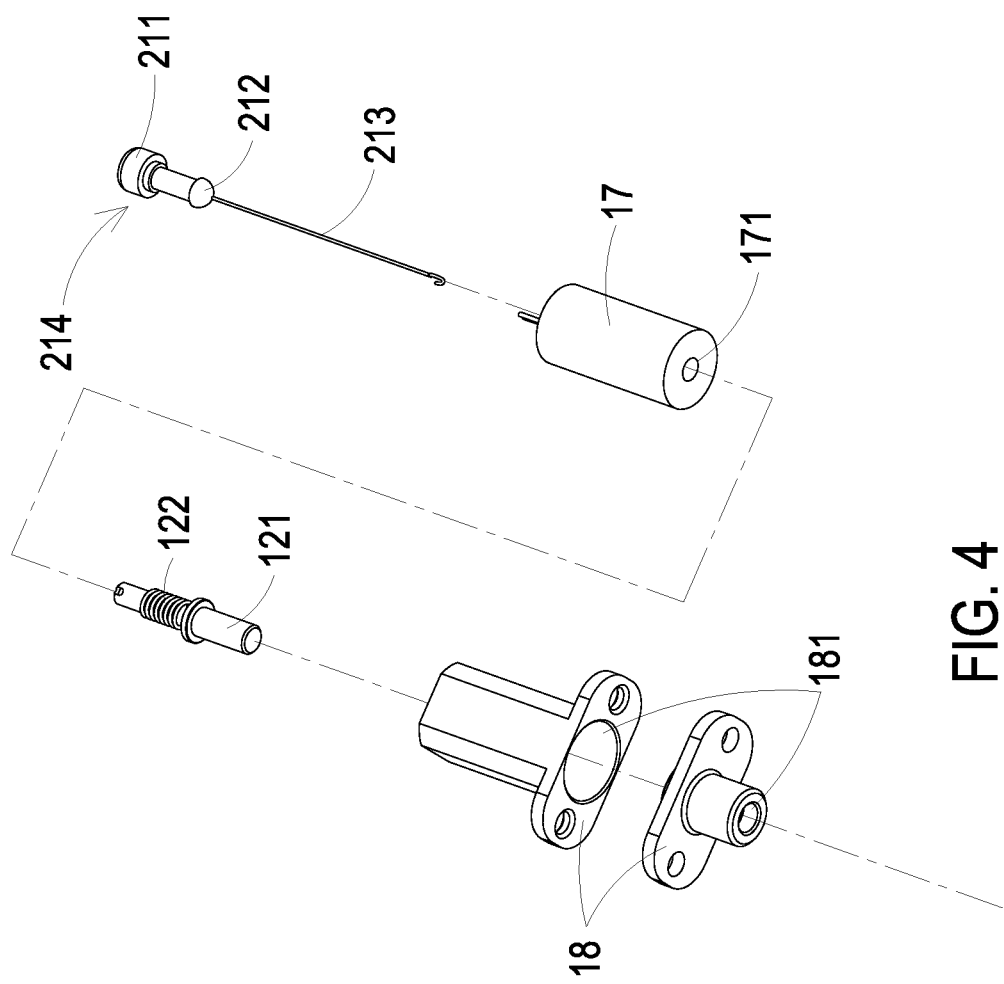
FIG. 4 is an exploded view illustrating the brake element and the brake release device of FIG. 1.

FIG. 1 is a schematic perspective view illustrating a robot manipulator and a brake release device according to an embodiment of the present disclosure. FIG. 2 is a schematic view showing the inner structure of the robot manipulator of FIG. 2. FIG. 3A is a cross-section view of the robot manipulator and the brake release device of FIG. 1, wherein the robot manipulator brakes. FIG. 3B is a cross-section view of the robot manipulator and the brake release device of FIG. 1, wherein the robot manipulator is allowed to actuate. FIG. 4 is an exploded view illustrating the brake element and the brake release device of FIG. 1. As shown in FIGS. 1, 2, 3A, 3B and 4, the robot manipulator 1 includes a housing 11, a brake element 12 and a brake release device 2. The housing 11 defines and forms an inner space 13, and the housing 11 has an opening 14. Through the opening 14, the inner space 13 is in communication with a space outside the housing 11. The brake element 12 is disposed within the inner space 13. According to the location of the brake element 12, the robot manipulator 1 stops or is allowed to actuate. The brake release device 2 is connected with the brake element 12. The brake release device 2 is partially located within the inner space 13, and partially exposed from the housing 11 through the opening 14. When the part of the brake release device 2 exposed from the housing 11 is moved by an external force applied, the brake release device 2 drives the brake element 12 to move synchronously. Consequently, the robot manipulator 1 is allowed to actuate. Since the brake release device 2 is partially exposed from the housing, the robot manipulator 1 may release a brake by the operator applying the external force on the part of the brake release device 2 exposed from the housing 11. Even if the power is interrupted exceptionally, the robot manipulator 1 is able to release the brake immediately without removing the housing 11.

In an embodiment, the robot manipulator 1 further includes a rotating shaft 15 and a ratchet 16, and the brake element 12 includes an actuator 17, a fixing bracket 18, a stop block 121 and an elastic element 122. The ratchet 16 is sleeved on the rotating shaft 15, and the movement of the robot manipulator 1 is driven by the rotation of the rotating shaft 15 and the ratchet 16. The actuator 17 is securely mounted inside the housing 11 and is kept stationary relative to the housing 11. Moreover, the actuator 17 includes a hollow portion 171 for the brake release device 2, the stop block 121 and the elastic element 122 to penetrate therethrough. The actuator 17 is for example but not limited to a solenoid valve or any element capable of providing driving power. The fixing bracket 18 includes a hollow portion 181 disposed corresponding to the hollow portion 171 of the actuator 17. For example, the hollow portions 171 and 181 are disposed on the same straight line. One terminal of the elastic element 122 is connected with the stop block 121, and the other terminal of the elastic element 122 is abutted against the fixing bracket 18. The brake release device 2 is securely connected with stop block 121 of the brake element 12. According to the relative position between the stop block 121 and the ratchet 16, the ratchet 16 can rotate or not and the robot manipulator 1 thereby stops or is allowed actuate. When the robot manipulator 1 is powered normally, the actuator 17 is controlled to drive the stop block 121 for braking or releasing the ratchet 16. When the power is interrupted exceptionally and can't be recovered, the part of the brake release device 2 exposed from the housing 11 is handled to release the brake. Then, an elastic force of the elastic element 122 pushes the stop block 121 to brake the robot manipulator 1. As shown in FIG. 3A, when the brake release device 2 is moved by the external force, the brake release device 2 drives the stop block 121 to move toward a direction away from the ratchet 16 and compress the elastic element 122. Accordingly, the stop block 121 moves to be out of the rotating path of the ratchet 16, and the ratchet 16 is allowed to rotate freely. Consequently, the robot manipulator 1 would be allowed to actuate. In an embodiment, the external force may be applied by the operator pulling the part of the brake release device 2 exposed from the housing 11. As shown in FIG. 3B, while the external force is eliminated, the elastic force of the elastic element 122 drives the stop block 121 to move toward the ratchet 16. Accordingly, the stop block 121 moves back to the rotating path of the ratchet 16 and blocks the ratchet 16, thus the ratchet 16 is unable to rotate. Consequently, the robot manipulator 1 would stop.

If the moving path of the brake release device 2 is too long, the brake release device 2 may be totally located within the inner space 13 or may overly protrudes from the housing 11, which should be avoided. Therefore, in an embodiment, the brake release device 2 further includes a first stop part 211 and a second stop part 212 opposite to the first stop part 211, but not exclusively. The first stop part 211 and the second stop part 212 are configured to limit the moving range of the brake release device 2. The first stop part 211 is exposed from the housing 11, and the second stop part 212 is located within the inner space 13. In addition, a diameter of the first stop part 211 and a diameter of the second stop part 212 are both larger than an aperture of the opening 14. Thus, in the brake release device 2, only the part between the first stop part 211 and the second stop part 212 is allowed to pass through the opening 14. The allowed moving distance of the brake release device 2 is equal to the distance between the first stop part 211 and the second stop part 212. In an embodiment, a diameter of the part of the brake release device 2 between the first stop part 211 and the second stop part 212 is smaller than the aperture of the opening 14. In an embodiment, the diameter of the part of the brake release device 2 between the first stop part 211 and the second stop part 212 is equal to the aperture of the opening 14, and that part of the brake release device 2 is in close contact with the opening 14. Consequently, the IP (Ingress Protection) characteristic of the robot manipulator 1 is maintained.

Figure 5:
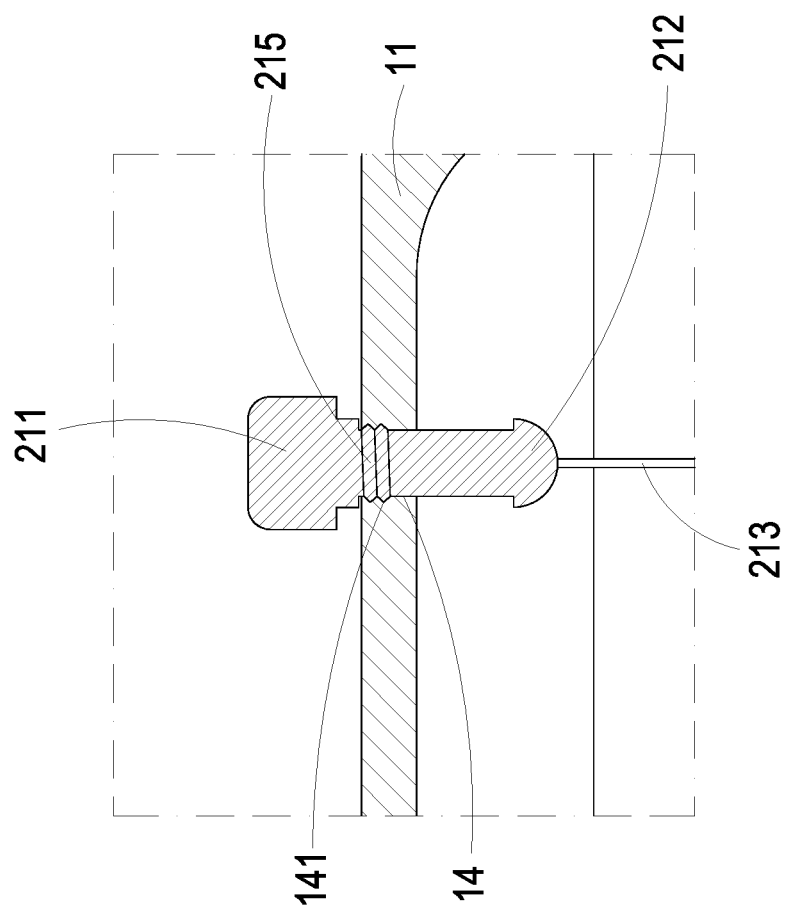
FIG. 5 is an enlarged graph of the dashed line block of FIG. 3B.

In an embodiment, as shown in FIG. 5, the brake release device 2 selectively includes a connection element 213 and a control knob 214. One terminal of the control knob 214 is exposed from the opening 14, and the other terminal of the control knob 214 is connected with the connection element 213. The connection element 213 is located within the inner space 13, and a terminal of the connection element 213 is connected with the brake element 12. The connection element 213 is for example but not limited to a flexible wire or an inflexible stock. In addition, the connection element 213 may be securely connected with the stop block 121. The control knob 214 includes a first fixing part 215, and a diameter of the first fixing part 215 is smaller than or equal to the aperture of the opening 14. The housing 11 further has a second fixing part 141 at the opening 14. The second fixing part 141 and the first fixing part 215 have relative structures for being combined or engaged together. By the combination of the first fixing part 215 and the second fixing part 141, the control knob 214 is securely mounted at the opening 14. When the first fixing part 215 is separated from the second fixing part 141 of the housing 11, the control knob 214 is allowed to move at the opening 14. In an embodiment, the first fixing part 215 and the second fixing part 141 are for example but not limited to have corresponding threads. Accordingly, the first fixing part 215 may be assembled with or separated from the second fixing part 141 by rotation. Consequently, the control knob 214 is detachably assembled with the housing 11. In addition, the first fixing part 215 and the second fixing part 141 may be assembled together by engagement or wedging, but not exclusively. When the control knob 214 is moved by the external force, the connection element 213 drives the stop block 121 to move toward the direction away from the ratchet 16 and compress the elastic element 122. Accordingly, the stop block 121 moves to be out of the rotating path of the ratchet 16, and the ratchet 16 is allowed to rotate freely. Consequently, the robot manipulator 1 would be allowed to move. In an embodiment, the external force may be applied by the operator pulling the part of the control knob 214 exposed from the housing 11. As shown in FIG. 3B, while stopping applying the external force, the elastic force of the elastic element 122 drives the stop block 121 to move toward the ratchet 16. Accordingly, the stop block 121 moves back to the rotating path of the ratchet 16 and block the ratchet 16, and the ratchet 16 is unable to rotate. Consequently, the robot manipulator 1 would be unable to move.

In an embodiment, the control knob 214 further includes the first stop part 211 and the second stop part 212. The first fixing part 215 is between the first stop part 211 and the second stop part 212, and the first fixing part 215, the first stop part 211 and the second stop part 212 are connected as an integral. The second stop part 212 is securely connected with the connection element 213. The allowed moving distance of the control knob 214 is equal to the distance between the first stop part 211 and the second stop part 212. In an embodiment, a diameter of the part of the control knob 214 between the first stop part 211 and the second stop part 212 is smaller than the aperture of the opening 14. In an embodiment, the diameter of the part of the control knob 214 between the first stop part 211 and the second stop part 212 is equal to the aperture of the opening 14, and that part of the control knob 214 is in close contact with the opening 14. Consequently, the IP characteristic of the robot manipulator 1 is maintained.

Figure 6:
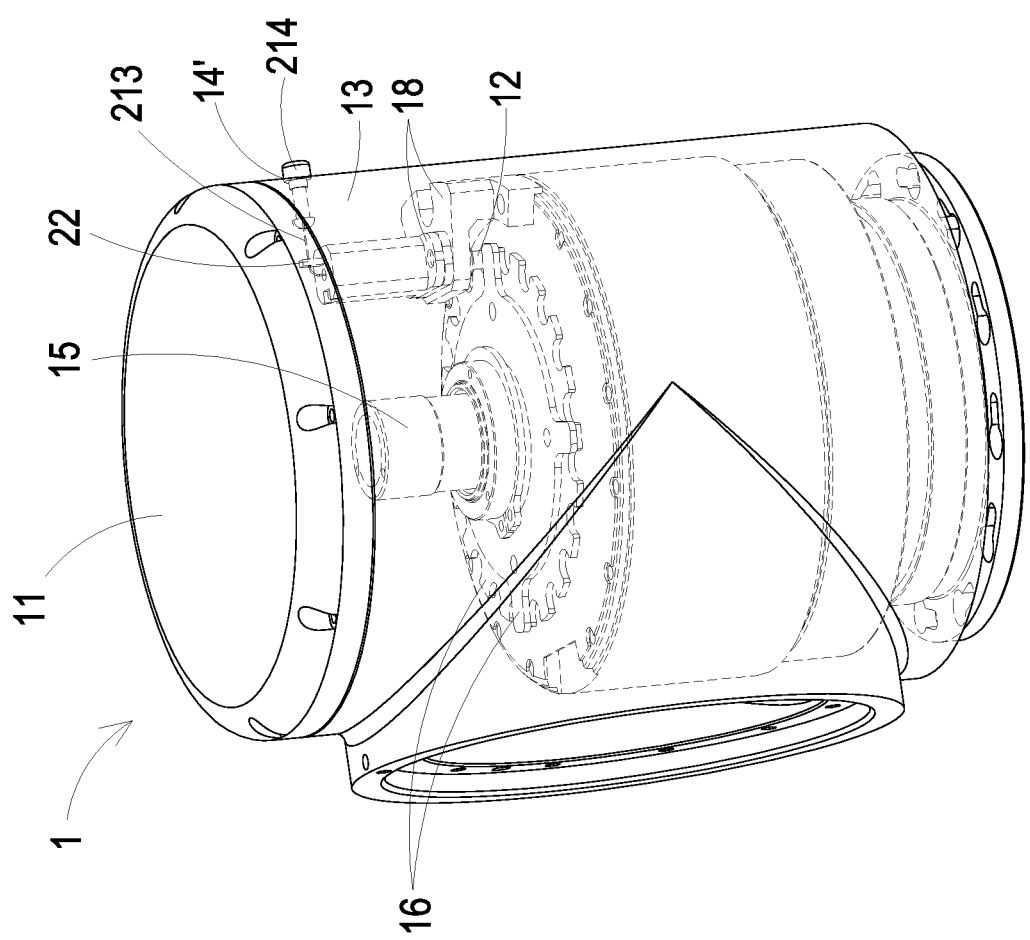
FIG. 6 is a schematic view showing the inner structure of the robot manipulator and a variant of the brake release device of FIG. 1.

Further, in above embodiments, the center of the opening 14 and the centers of the openings of the hollow portions 171 and 181 are located on the same straight line. Therefore, the connection element 213 penetrated through the hollow portions 171 and 181 extends toward the opening 14 without bending. However, in fact, the position of the opening is not limited. By bending the connection element 213, the brake release device 2 can be disposed corresponding to the position of the opening. As shown in FIG. 6, in an embodiment, the opening 14' is disposed on a circular sidewall of the housing 11. The center of the opening 14' and the centers of the openings of the hollow portions 171 and 181 are not located on the same straight line. The control knob 214 is mounted in the opening 14' and is connected with the connection element 213, where the connection element 213 is a flexible wire. In an embodiment, the brake release device 2 selectively includes a turning auxiliary element 22. The turning auxiliary element 22 has a hollow portion for the connection element 213 to penetrate therethrough. The turning auxiliary element 22 is configured to aid the connection element 213 in bending. Therefore, the connection element 213 and control knob 214 can be disposed corresponding to the position of the opening 14. In this embodiment, the turning auxiliary element 22 is utilized to aid the connection element 213 in bending. Thus, the bent connection element 213 extends toward the opening 14', and the connection element 213 and the control knob 214 are disposed corresponding to the position of the opening 14'.

In the embodiment shown in FIG. 2, the external force is applied by pulling the part of the brake release device 2 exposed from the housing 11 to release the ratchet 16. Namely, owing to the external force applied, the brake release device 2 drives the brake element 12 to move toward the opening 14 synchronously, so that the robot manipulator 1 would recover from brake lock. However, in another embodiment, the external force is applied by pushing the part of the brake release device 2 exposed from the housing 11. Accordingly, the brake release device 2 drives the brake element 12 to move toward the direction away from the opening 14, and the robot manipulator 1 would be allowed to actuate. FIGS. 7, 8, 9A and 9B are exemplary shown for further descriptions.

Figure 7:
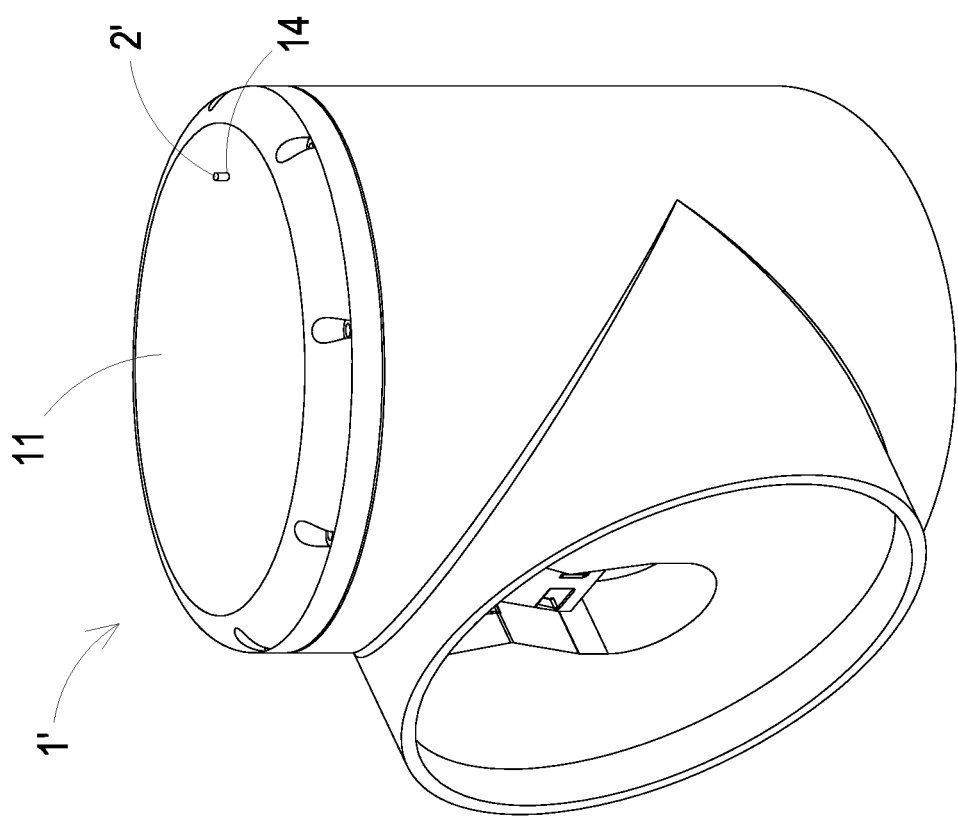
FIG. 7 is a schematic perspective view illustrating a robot manipulator and a brake release device according to another embodiment of the present disclosure.
Figure 8:
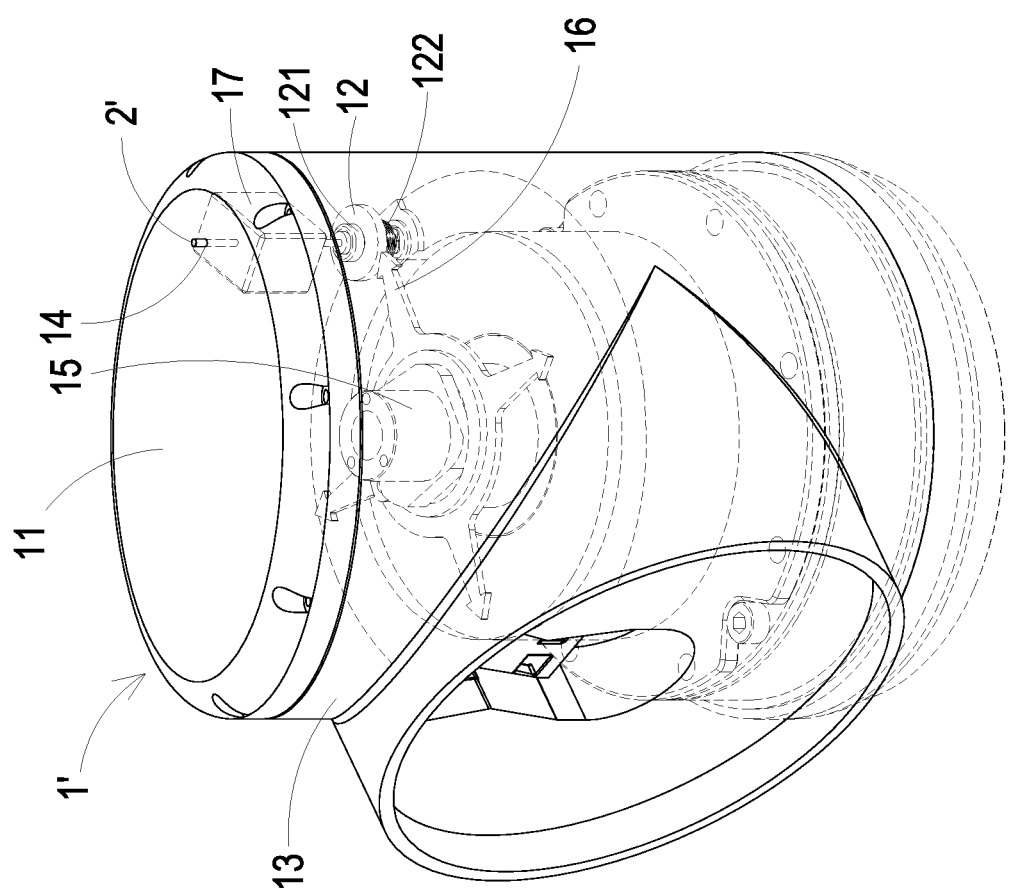
FIG. 8 is a schematic view showing the inner structure of the robot manipulator of FIG. 7.
Figure 9A:
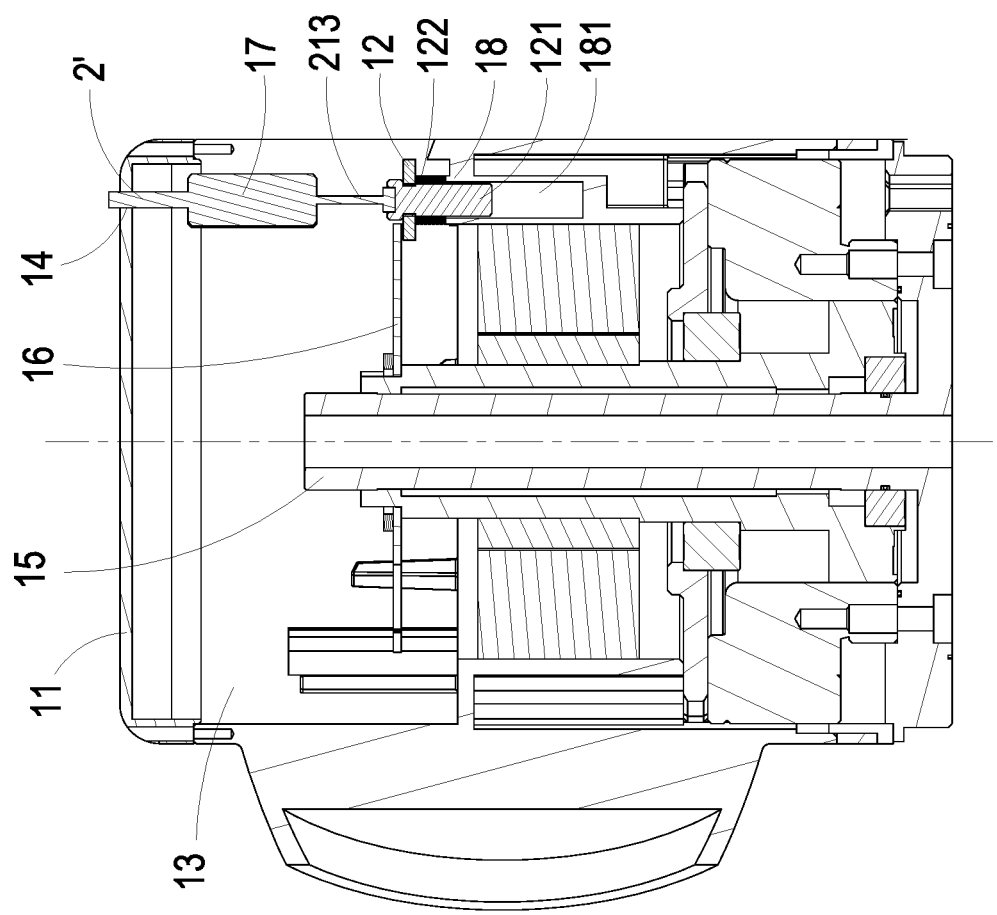
FIG. 9A is a cross-section view of the robot manipulator and the brake release device of FIG. 7, wherein the robot manipulator brakes.
Figure 9B:
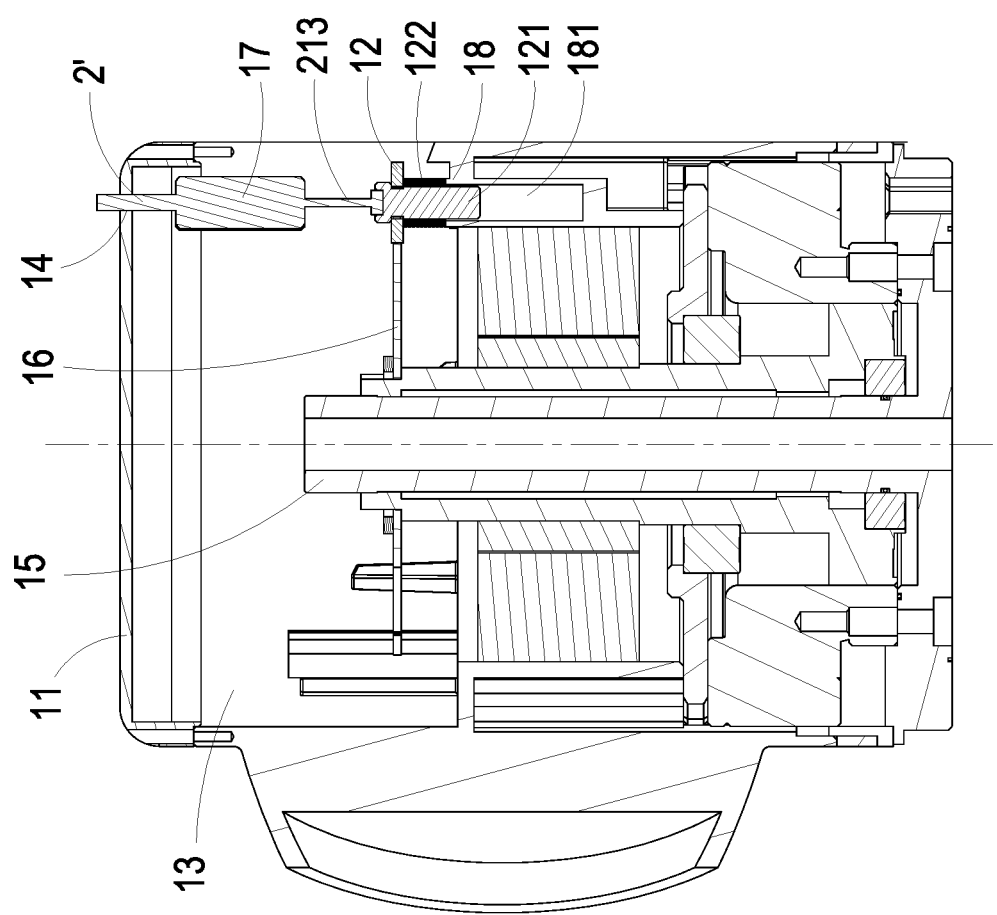
FIG. 9B is a cross-section view of the robot manipulator and the brake release device of FIG. 7, wherein the robot manipulator releases the brake.

FIG. 7 is a schematic perspective view illustrating a robot manipulator and a brake release device according to another embodiment of the present disclosure. FIG. 8 is a schematic view showing the inner structure of the robot manipulator of FIG. 7. FIG. 9A is a cross-section view of the robot manipulator and the brake release device of FIG. 7, wherein the robot manipulator brakes. FIG. 9B is a cross-section view of the robot manipulator and the brake release device of FIG. 7, wherein the robot manipulator releases the brake. In FIGS. 7, 8, 9A and 9B, the elements and structures corresponding to those of FIGS. 1, 2, 3A and 3B are designated by identical numeral references, and detailed descriptions thereof are omitted. Compared with the robot manipulator 1 and the brake release device 2 of FIGS. 1, 2, 3A and 3B, in the robot manipulator 1' and the brake release device 2' of FIGS. 7, 8, 9A and 9B, the relative positions among the ratchet 16, the stop block 121, the elastic element 122 and the actuator 17 are different. As shown in FIGS. 3A and 3B, in two sides separated by a plane where the ratchet 16 is located, the elastic element 122 is located at the side closer to the opening 14. On the contrary, as shown in FIGS. 9A and 9B, the connection element 213 is connected with or neighboring to the stop block 121. In two sides separated by the plane where the ratchet 16 is located, the elastic element 122 is located at the side farther from the opening 14. One terminal of the elastic element 122 is connected with the stop block 121, and the other terminal of the elastic element 122 is abutted against the fixing bracket 18. Therefore, in the robot manipulator 1' and the brake release device 2' of FIGS. 7, 8, 9A and 9B, as shown in FIG. 9A, the external force drives the brake release device 2' to move toward the direction away from the opening 14 or move toward the inner space 13. The brake release device 2' drives the stop block 121 of the brake element 12 to move toward the direction away from the ratchet 16 synchronously, and the elastic element 122 is compressed by the stop block 121. Consequently, the stop block 121 moves to be out of the rotating path of the ratchet 16, and the robot manipulator 1' releases the brake. A shown in FIG. 9B, the elastic force of the elastic element 122 drives the stop block 121 to move toward the opening 14 and get closer to the ratchet 16. Consequently, the stop block 121 locates on the rotating path of the ratchet 16 and blocks the ratchet 16, and the robot manipulator 1' brakes.

Actually, the way and direction of applying the external force can be adjusted according to the configurations and the relative position of the brake release device and the brake element 12, but not limited to the above illustrations. The conditions should be satisfied are: the brake element 12 is moved to be out of the rotating path of the ratchet 16 while the external force is applied on the brake release device; the brake element 12 is replaced by the driving of the elastic force of the elastic element 122 and blocks the ratchet 16; and the operator is able to brake or release the brake immediately outside the housing 11.

The brake release device may be entirely made of inflexible material, or the brake release device is integrally formed by inflexible material. Alternatively, a part of the brake release device is made of flexible material, and the other part of the brake release device is made of inflexible material. The flexible part is securely connected between the brake element 12 and the inflexible part, and the inflexible part is partially exposed from the housing 11.

From the above descriptions, the present disclosure provides a brake release device and a robot manipulator employing the same. In the robot manipulator, the brake element is located in the inner space of the housing. According to the location of the brake element, the robot manipulator brakes or releases the brake. The brake release device is connected with the brake element, and a part of the brake release device penetrates through the opening on the housing and exposes from the housing. The operator can apply an external force on the part of the brake release device exposed from the housing, and the brake release device drives the brake element to move synchronously. Consequently, the robot manipulator releases the brake. Since the operator can release the brake of the robot manipulator by pushing or pulling the brake release device outside the robot manipulator, the robot manipulator is able to release the brake immediately without removing the housing when the power is interrupted exceptionally.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A brake release device for a robot manipulator, wherein the robot manipulator comprises a housing and a brake element, the housing defines and forms an inner space, the housing has an opening, the inner space is in communication with a space outside the housing through the opening, the brake element is disposed within the inner space, the robot manipulator stops or is allowed to actuate according to a position of the brake element, wherein the brake release device is connected with the brake element, a first part of the brake release device is located in the inner space, a second part of the brake release device penetrates through the opening and is exposed from the housing, and when the part of the brake release device exposed from the housing is moved by an external force so as to drive the brake element to move synchronously, the robot manipulator is allowed to actuate, wherein the brake release device comprises a first stop part and a second stop part opposite to the first stop part, the first stop part is exposed from the housing, the second stop part is located within the inner space, a diameter of the first stop part and a diameter of the second stop part are both larger than an aperture of the opening, and when the first stop part is moved by the external force so as to drive the brake element to move synchronously, the robot manipulator is allowed to actuate, and a position of the first stop part or a position of the second stop part is limited by the opening.

2. The brake release device according to claim 1, wherein the brake release device is entirely made of an inflexible material and is securely connected with the brake element.

3. The brake release device according to claim 1, wherein the brake release device is partially made of a flexible material and is partially made of an inflexible material.

4. The brake release device according to claim 1, wherein a diameter of a part between the first stop part and the second stop part is smaller than or equal to the aperture of the opening.

5. The brake release device according to claim 1, further comprising a connection element and a control knob, wherein the connection element is located within the inner space and is connected with the brake element, a first terminal of the control knob is exposed from the opening, a second terminal of the control knob is connected with the connection element, the control knob comprises a first fixing part, the housing further has a second fixing part at the opening, the control knob is assembled with the housing when the first fixing part and the second fixing part are combined together, wherein when the first fixing part is separated from the second fixing part, and the control knob is driven by the external force to move toward a direction away from the inner space so as to drive the connection element and the brake element to move synchronously, the robot manipulator is allowed to actuate.

6. The brake release device according to claim 5, wherein the control knob further comprises the first stop part and the second stop part, the first fixing part is between the first stop part and the second stop part, the first stop part, the first fixing part and the second stop part are connected in sequence, the second stop part is connected with the connection element, and a diameter of the first fixing part is smaller than or equal to an aperture of the opening.

7. The brake release device according to claim 5, wherein the connection element is made of a flexible material.

8. The brake release device according to claim 1, wherein the robot manipulator further comprises a rotating shaft and a ratchet, the ratchet is sleeved on the rotating shaft, the brake element comprises a stop block and an elastic element, and when the brake release device is moved by the external force so as to move the stop block toward a direction away from a rotating path of the ratchet and compress the elastic element, the robot manipulator is allowed to actuate, wherein while the external force is eliminated, an elastic force of the compressed elastic element drives the stop block to move toward the ratchet and back to the rotating path of the ratchet and blocks the ratchet and thereby the robot manipulator stops.

9. The brake release device according to claim 8, wherein the brake element further comprises an actuator and a fixing bracket, the actuator is securely mounted on the housing, the actuator has a hollow portion for the brake release device, the stop block and the elastic element to penetrate therethrough, the hollow portion of the actuator is disposed corresponding to a hollow portion of the fixing bracket, a first terminal of the elastic element is connected with the stop block, and a second terminal of the elastic element is abutted against the fixing bracket.

10. The brake release device according to claim 1, wherein when the brake release device is applied with the external force, the brake release device moves toward a direction away from the inner space.

11. The brake release device according to claim 1, wherein when the brake release device is applied with the external force, the brake release device moves toward the inner space.

12. A robot manipulator comprising a housing, a brake element and a brake release device, wherein the housing defines and forms an inner space, the housing has an opening, the inner space is in communication with a space outside the housing through the opening, the brake element is disposed within the inner space, the robot manipulator stops or is allowed to actuate according to a position of the brake element,
  wherein the brake release device is connected with the brake element, a first part of the brake release device is located in the inner space, a second part of the brake release device penetrates through the opening and is exposed from the housing, and when the part of the brake release device exposed from the housing is moved by an external force so as to drive the brake element to move synchronously, the robot manipulator is allowed to actuate,
  wherein the brake release device comprises a first stop part and a second stop part opposite to the first stop part, the first stop part is exposed from the housing, the second stop part is located within the inner space, a diameter of the first stop part and a diameter of the second stop part are both larger than an aperture of the opening, and when the first stop part is moved by the external force so as to drive the brake element to move synchronously, the robot manipulator is allowed to actuate, and a position of the first stop part or a position of the second stop part is limited by the opening,
  wherein a moving direction of the second part of the brake release device is parallel to a moving direction of the brake element.

13. The robot manipulator according to claim 12, wherein the brake release device comprises a connection element and a control knob, the connection element is located within the inner space and is connected with the brake element, a first terminal of the control knob is exposed from the opening, a second terminal of the control knob is connected with the connection element, the control knob comprises a first fixing part, the housing further comprises a second fixing part at the opening, the control knob is assembled with the housing when the first fixing part and the second fixing part are combined together, wherein when the first fixing part is separated from the second fixing part and the control knob is driven by the external force to move toward a direction away from the inner space so as to drive the connection element and the brake element to move synchronously, the robot manipulator is allowed to actuate.

14. The robot manipulator according to claim 13, wherein the control knob further comprises the first stop part and the second stop part, the first fixing part is between the first stop part and the second stop part, the first stop part, the first fixing part and the second stop part are connected in sequence, the second stop part is connected with the connection element, and a diameter of the first fixing part is smaller than or equal to an aperture of the opening.

15. The robot manipulator according to claim 14, wherein a diameter of a part between the first stop part and the second stop part is smaller than or equal to the aperture of the opening.

16. The robot manipulator according to claim 15, further comprising a rotating shaft and a ratchet, wherein the ratchet is sleeved on the rotating shaft, the brake element comprises a stop block and an elastic element, when the brake release device is moved by the external force so as to drive the stop block to move toward a direction away from a rotating path of the ratchet and compress the elastic element, the robot manipulator is allowed to actuate, and wherein while the external force is eliminated, an elastic force of the compressed elastic element drives the stop block to move toward the ratchet and back to the rotating path of the ratchet and blocks the ratchet and thereby the robot manipulator stops.

17. The robot manipulator according to claim 16, wherein the brake element further comprises an actuator and a fixing bracket, the actuator is securely mounted on the housing, the actuator has a hollow portion for the brake release device, the stop block and the elastic element to penetrate therethrough, the hollow portion of the actuator is disposed corresponding to a hollow portion of the fixing bracket, a first terminal of the elastic element is connected with the stop block, and a second terminal of the elastic element is abutted against the fixing bracket.

18. The robot manipulator according to claim 17, wherein when the control knob is applied with the external force, the control knob drives the connection element and the stop block to move toward the opening or move toward a direction away from the inner space, and the elastic element is compressed.

19. The robot manipulator according to claim 17, wherein when the control knob is applied with the external force, the control knob drives the connection element and the stop block to move toward a direction away from the opening or move toward the inner space, and the elastic element is compressed.

* * * * *